United States Patent [19]

Courtin et al.

[11] 3,916,878

[45] Nov. 4, 1975

[54] CIRCUIT ARRANGEMENT FOR PRODUCING A PULSE SEQUENCE CORRESPONDING TO A FOETAL CARDIAC RHYTHM

[75] Inventors: Erich Courtin, Sindelfingen; Stefan Traub, Boblingen, both of Germany

[73] Assignee: Hewlett-Packard GmbH, Boblingen, Germany

[22] Filed: May 29, 1974

[21] Appl. No.: 474,474

[30] Foreign Application Priority Data

June 5, 1973 Germany ............................ 2328468

[52] U.S. Cl. ............................................ 128/2.06 F

[51] Int. Cl.² ............................................ A61B 5/04

[58] Field of Search ...... 128/2.05 P, 2.05 R, 2.05 S, 128/2.05 T, 2.06 A, 2.06 F, 2.06 R

[56] References Cited

UNITED STATES PATENTS

| | | | |
|---|---|---|---|
| 3,581,735 | 6/1971 | Gentner et al. | 128/2.06 F |
| 3,599,628 | 8/1971 | Abbenante et al. | 128/2.06 F |
| 3,811,428 | 5/1974 | VanHorn et al. | 128/2.06 F |

*Primary Examiner*—William E. Kamm
*Attorney, Agent, or Firm*—Theodore S. Park

[57] ABSTRACT

The present invention relates to a circuit arrangement for producing a pulse sequence corresponding to a foetal cardiac rhythm from a composite signal of an electrocardiogram which includes signals produced by the mother and other sources in addition to the desired foetal signals. The composite signal is conditioned to be within a predetermined dynamic amplitude range and applied to a noise filter. The noise filtered composite signal is applied to two signal processing channels which produce pulse sequences corresponding to the time interval between recurring maternal and foetal QRS complexes.

3 Claims, 5 Drawing Figures

FIGURE I

CIRCUIT ARRANGEMENT FOR PRODUCING A PULSE SEQUENCE CORRESPONDING TO A FOETAL CARDIAC RHYTHM

BACKGROUND OF THE INVENTION

Circuit arrangements of this type are commonly used in pre-natal and natal supervision for detecting changes in the foetal heart rate that may be caused by oxygen deficiency, coiling of the cord, and a number of other complications, so that immediate action may be taken when the presence of such a dangerous situation for the foetus and/or the mother is detected.

The underlying measuring problem is highly complicated by a number of factors. The maternal electrocardiogram signals are normally of a magnitude higher than that of the foetal signals to be measured. The foetal signals are very often of a lower magnitude than interference signals produced by the mother's and the foetus's movements, by stray pick-ups and by other interference factors. In addition, the dynamic range of the foetal QRS complex signals is relatively broad so that the foetal signals may occasionally reach the magnitude of the maternal signals. Also, there does not exist any correlation between the foetal and the maternal heart rates which creates an interference effect of a special nature in that it provides the possibility that the foetal and the maternal QRS complexes may overlap in time.

Apart from these measuring problems it is of essential importance in the daily operation of such equipment that operation be as simple as possible in order to eliminate the danger of operating errors that may have grave consequences and to permit troublefree continuous operation allowing for long-term supervision without the continued presence of an operator.

SUMMARY OF THE INVENTION

It is a main object of the present invention to provide a circuit arrangement which permits continuous, fully-automatic and troublefree supervision of the foetal heart rate.

Means for receiving the composite signals of an electrocardiogram are provided which condition the latter to be within a predetermined dynamic range. The conditioned signal is applied to a band-rejection filter whose center frequency follows automatically and filters out the power line frequency component in the signal. The output from the band-rejection filter is applied to two signal processing channels.

The first channel is provided with a band-pass filter whose pass range is adapted to the maternal signals which exhibit frequencies lower than those contained in the foetal QRS complex. The output of this band-pass filter is applied to a polarity-reversal means for ensuring that the dominating component of the maternal signal has a predetermined polarity. Maternal signals having the defined polarity and the foetal signals, which after passage through the band-pass filter are of lesser magnitude as compared to the maternal signals, are applied to a first trigger circuit. Based on the difference in amplitude between the maternal and the foetal signals, the trigger circuit detects the time sequence of the maternal signals and emits a pulse sequence corresponding to the time sequence of the maternal signals.

The second channel has a second bandpass filter having a pass band corresponding to the foetal signals which have higher frequencies than the maternal signals. The second bandpass filter is connected to a second polarity-reversal means for ensuring that the dominating component of the foetal QRS complex has a predetermined polarity. A second trigger circuit is provided for deriving a pulse sequence corresponding to the time sequence of the foetal signals.

Blocking signals are derived from the pulse sequence of the first channel and applied to the second trigger circuit of the second channel so that the latter does not trigger in response to the maternal signals. An error detector is connected to the trigger circuit of the second channel and emits a signal when no foetal signal is received during any expectancy interval, which has been derived from at least one preceding signal period. The error detector provides for a certain tolerance and the indication of the pulses derived from the foetal QRS signals is at least delayed by the maximum physiological time interval between succeeding foetal signals.

The use of a conventional means for narrowing the dynamic range ensures that regardless of the instantaneous value of the signals to be measured, which may vary within very broad limits, the signal supplied into the evaluating circuitry lies within a predetermined dynamic range so that there is no need for manual adjustment or readjustment of the amplification. Moreover, the circuit arrangement of the embodiment of the invention functions independently of the respective polarity of the foetal and the mother's signals, which again eliminates the necessity of a manual adjustment and the sources of errors connected therewith. The need for additional indicating means, such as an oscillograph, is also eliminated. The troublefree operation of the equipment, which must necessarily be demanded when the equipment is used for continuous operation, is ensured by a band-rejection filter which automatically follows the interference component of the power line frequency contained in the signal, since as is generally known the power line frequency is subject to variations over extended periods of time. The reliability of the measurement is also improved by the fact that a corresponding signal correction will be effected in the unit in the event that an occasional foetal signal is missing.

DESCRIPTION OF THE PREFERRED EMBODIMENT

Figure 1:
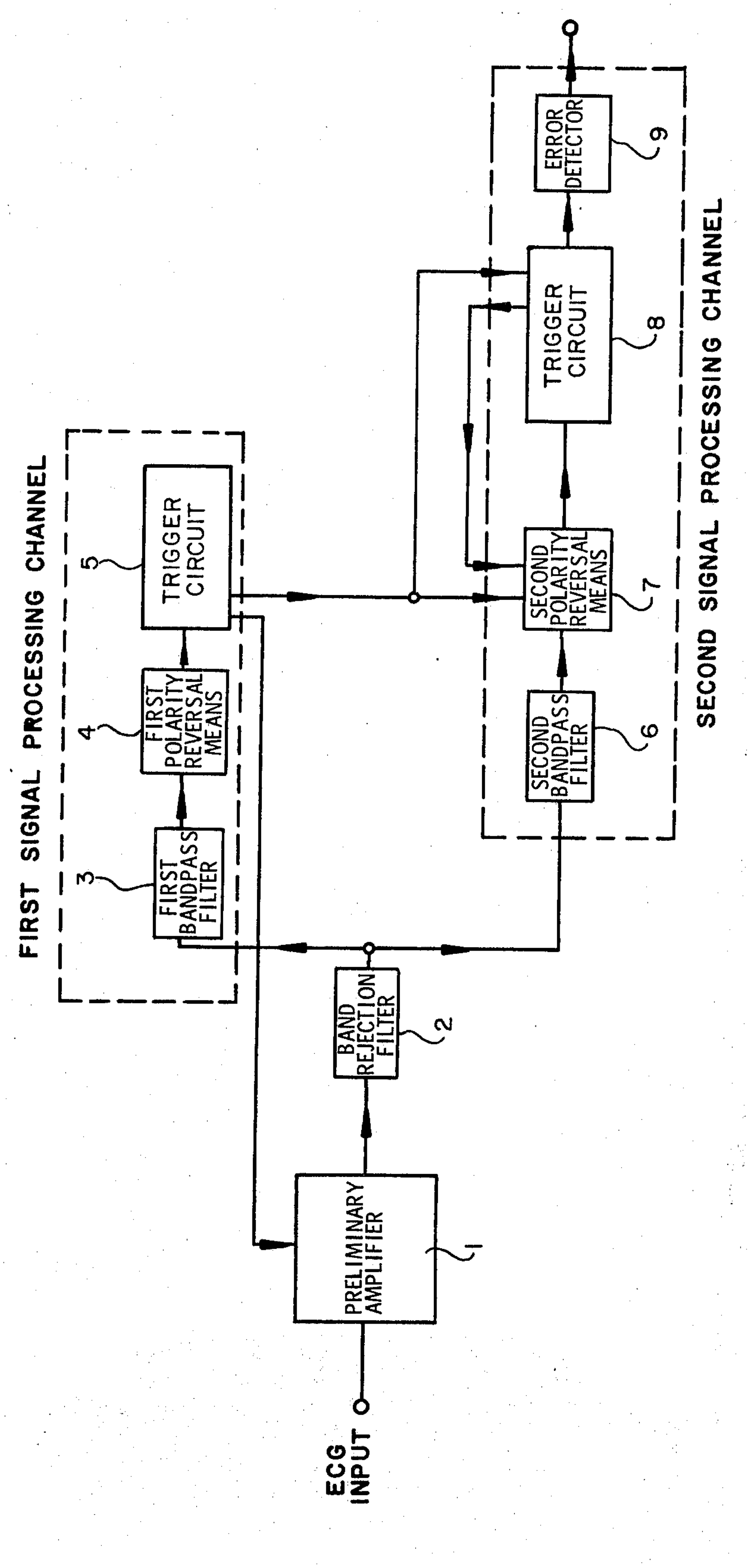
FIG. 1 is a block diagram illustrating a preferred embodiment of the invention.

The electrocardiograms of the foetus and the mother are obtained, for example, by means of signal electrodes applied to the mother's abdominal wall. Referring to FIG. 1, the electrodes are connected to a preliminary amplifier 1 whose amplification is automatically regulated to ensure a constant value of the maternal signal component. The composite signal comprising the foetal and the maternal signal components as well as interference signals is supplied into a tracking band-rejection filter 2 for rejecting the power line frequency component normally observed in the signal within a range of 48 to 62 Hertz. After elimination of the power line frequency component from the composite signal, the composite signal is supplied into a first channel for processing the maternal signals and into a second channel for processing the foetal signals.

In the first channel, a first bandpass filter 3 is provided with a center frequency of 18 cycles which is tuned to the low frequencies of the maternal QRS complex so that these low frequencies are pre-emphasized in relation to the foetal QRS complex. The signal mixture obtained at the output of first bandpass filter 3, in which the maternal signals have been emphasized in relation to the foetal signals, is then applied to first polarity-reversal means 4 which gives the dominating component of the maternal signal a predetermined polarity. From the output of the first polarity-reversal means, the signal mixture, now having the predetermined polarity and the amplified maternal signal portion, is applied to a first trigger circuit 5 which derives a pulse sequence in accordance with the maternal signals.

In the second channel, the output from the band-rejection filter 2 is applied to a second bandpass filter 6 having a mean frequency of 35 Hz, so that the maternal QRS complex is attenuated in relation to the foetal QRS complex. The signal mixture obtained at the output of second bandpass filter 6 is applied to second polarity-reversal means 7 to ensure that the dominating component of the foetal QRS complex has or is given a predetermined polarity. For this purpose, an interlocking connection is provided between the first trigger circuit 5 in the first channel and the second polarity-reversal means 7 in the second channel in order to prevent maternal signals from interfering with the determination of the polarity in the second channel.

Thus, the signal mixture leaving the output of the second polarity-reversal means 7 has a predetermined polarity of the foetal signals and emphasized foetal signal portions. This signal mixture is applied to a second trigger circuit 8 which derives a pulse sequence in accordance with the foetal signals in the second channel. For this purpose, another interlocking connection is provided between the first trigger circuit 5 in the first channel and the second trigger circuit 8 in the second channel to prevent triggering in the second channel when a maternal signal is detected in the first channel. Furthermore, a circuit is provided between the second trigger means 8 and the second polarity-reversal means 7 in the second channel in order to ensure that the second polarity-reversal means is operated only coincidently with the foetal signals. The output of the second trigger means 8 emits a pulse sequence corresponding to the foetal signals, in which individual pulses may be missing due to the fact that they were suppressed by simultaneous maternal signals. Failing pulses in the pulse sequence corresponding to the foetal heart rhythm are detected by an error detector 9.

The design of the ECG preamplifier 1 with adjustable amplitude may, for example, essentially correspond to the ECG amplifier described in Hewlett-Packard Manual No. 8020, April 1971, circuit diagram A2-19. However, any other circuit suited for narrowing the dynamic range may also be used instead of an adjustable amplifier.

The band-rejecting filter 2 may preferably have a design similar to that described in U.S. Pat. No. 3,787,774 entitled "Filter Circuitry" and filed for the same assignee. In this case, the power line voltage and, thus, the information regarding the power line frequency of the circuit arrangement need not be directly applied, since the filter will automatically select the power line frequency component from the signal mixture. As a result, the trigger sequence may be derived also from signals supplied to the unit in stored form, as for instance from a magnetic tape.

A harmonic comb filter may also be employed which will suppress not only the power line frequency interference component but also the latter's harmonic waves.

The design of the bandpass filter 3 in the first channel may correspond to the bandpass described in the book entitled "Halbleiter-Schaltungstechnik", 2nd edition, by U. Tietze, Ch. Schenk, Springer publishers, page 276. This bandpass filter is of a two-pole design, has a mean frequency of 18 cycles and an energy factor of 1.

Figure 2:
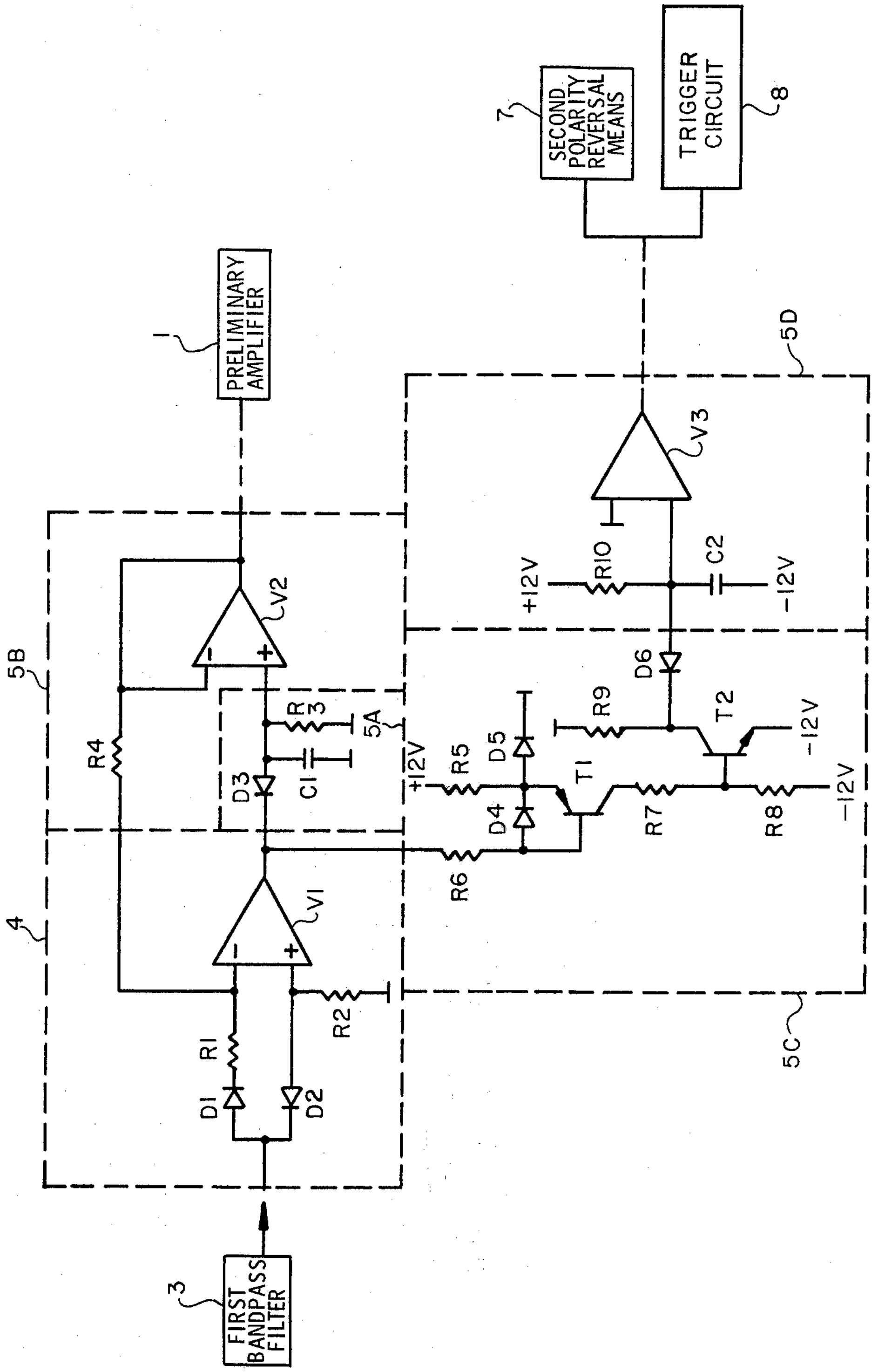
FIG. 2 is a circuit diagram including a preferred embodiment of a first polarity-reversal means and first trigger circuit for giving all maternal signals a predetermined polarity and for deriving trigger signals corresponding to the time sequence of the maternal signals.

FIG. 2 shows greater detail of the first polarity-reversal means 4 and the first trigger circuit 5. The signal mixture coming from first bandpass filter 3, with the maternal signal components emphasized, is applied to the first polarity-reversal means 4 having the form of a full-wave rectifier. The latter comprises an amplifier V1 which has connected to its inverting input a diode D1 and a resistance R1 and to its non-inverting input a diode D2 and a resistance R2 with one grounded end. The signal mixture obtained by full-wave rectification is then applied to a peak rectifier 5A.

As shown in FIG. 2, the peak rectifier 5A comprises a diode D3, a capacitor C1 and a discharge resistance R3 and is connected to a voltage follow-up circuit 5B (voltage amplification 1). Voltage follow-up circuit 5B comprises a degenerative amplifier V2 and a resistance R4 and is coupled back to the inverting input of the preamplifier V1. A control voltage is derived from the output of the voltage follow-up circuit 5B and is applied to the preamplifier 1 in order to maintain the level of the maternal signals at a constant value.

The circuits 5A and 5B ensure that the charge of capacitor C1 in the peak rectifier 5A will comply exactly with the voltage encountered at the input of the amplifier V1. When the diode D3 is conductive, the voltage follow-up circuit 5B and the resistance R4 form a degenerative feedback for the amplifier V1 so that the voltage at the capacitor C1 is adjusted exactly to the voltage appearing at the input of the amplifier V1. If, on the other hand, the value of the input signal drops below the voltage encountered at the capacitor C1, the diode D3 is blocked and the degenerative feedback of the amplifier V1 is interrupted so that the amplifier V1 saturates and the voltage at the amplifier output leaps to its positive saturation potential. The steep voltage slope thus created is encountered exactly at the moment of the highest signal voltage and opens an electronic switch 5C.

The switch 5C, as shown in FIG. 2, is of conventional design and comprises a transistor T1, a transistor T2, resistances R5, R6, R7, R8, R9 and a protective diode D4, a clamping diode D5 and a switching diode D6. When the electronic switch opens, the diode D6 is blocked and the holding time of a monostable sweep stage 5D is started.

The monostable sweep stage 5D comprises an amplifier V3, a capacitor C2 and a discharge resistance R10. At the end of a holding time, a steep negative pulse slope is emitted at the output of the amplifier V3 and forms the output of the trigger circuit 5. The electronic switch 5C is closed when the diode D3 is in the conductive stage, i.e. while the capacitor C1 is recharged to the maximum signal voltage. The output signal of the monostable sweep stage 5D becomes positive when the electronic switch 5C closes and it becomes negative in the manner described above at the end of a certain predetermined time following the opening of the electronic switch. The predetermined period of time is selected to ensure that even broad maternal signals are still masked. As a result, the trigger circuit 5 and its monostable sweep stage 5D emit a sequence of square pulses which are then applied via interconnecting lines to the polarity-reversal means 7 and the second trigger circuit 8.

Hereafter, the most essential circuit components of the second channel will be described.

The design of the second bandpass 6 filter corresponds to the circuit described in the book entitled "Halbleiterschaltungstechnik," by U. Tietze, Ch. Schenk, Springer publishers, 2nd edition, page 276. This bandpass filter is of a two-pole design and has a mean frequency of 35 cycles and an quality factor of 1.

Figure 3:
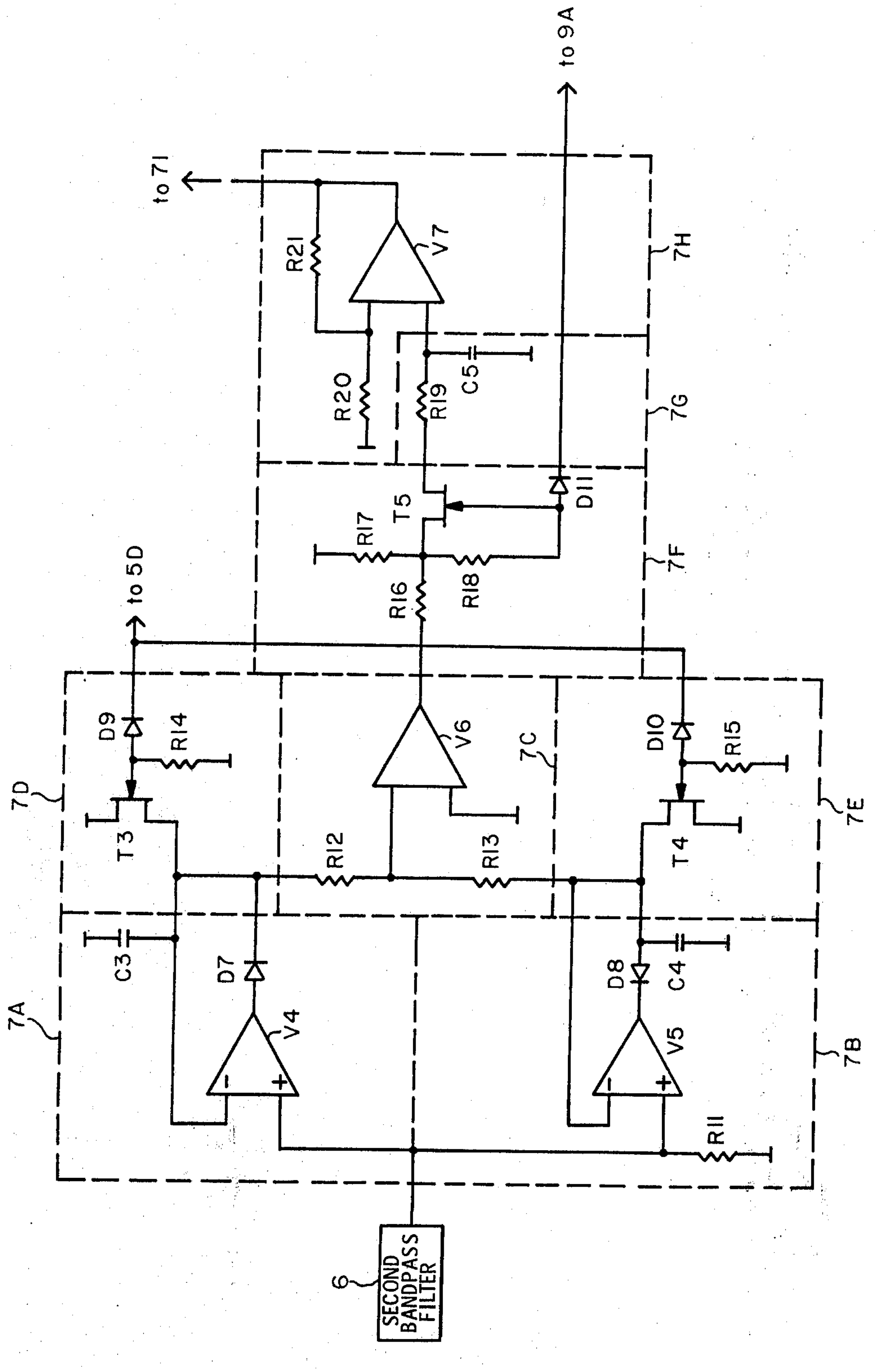
FIG. 3 is a circuit diagram of a portion of a second polarity-reversal means which detects the polarity of foetal signals.
Figure 4:
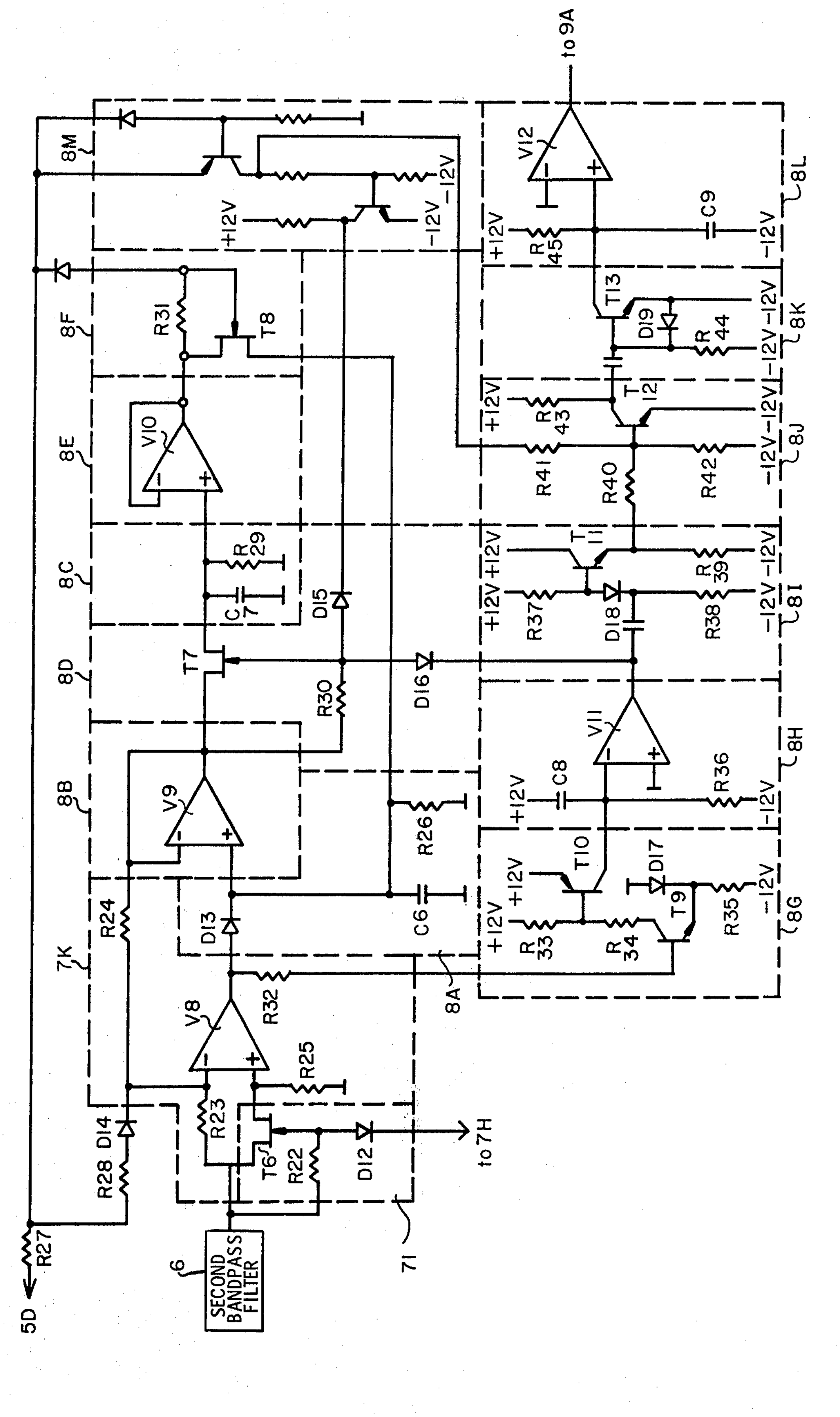
FIG. 4 is a circuit diagram of a portion of a second polarity-reversal means and a second trigger circuit which gives all foetal signals a predetermined polarity and derives trigger signals therefrom.

Referring to FIG. 3 and the left portion of FIG. 4, second polarity-reversal means 7 comprising circuits 7A–I for detecting and reversing polarity is shown.

Referring to FIG. 3, the signal mixture obtained at the output of second bandpass filter 6 is applied to two similarly set up peak rectifiers 7A and 7B for separate storage of the peak values of the positive and negative half-wave of the foetal signal.

The peak rectifier 7A for the positive half-wave comprises an amplifier V4 whose output is negatively fed back via a diode D7 to the inverting amplifier input. Due to this circuit arrangement, the characteristics of an idealized diode is obtained. The cathode of the diode D7 is connected to a storage capacitor C3 which has its other end grounded.

The peak rectifier 7B for the signals with negative polarity is set up analogously to peak rectifier 7B and comprises an amplifier V5, a diode D8 and a storage capacitor C4; the non-inverting input of both amplifiers V4 and V5 are connected to the second bandpass 3 and grounded via a common resistance R11.

Both storage capacitors C3 in peak rectifier 7A and C4 in peak rectifier 7B are connected to a comparator 7C having identical summing resistances R12 and R13 in the inverting input of an amplifier V6. The output of the comparator 7C emits either a positive or a negative saturation voltage, the saturation voltage being determined by the magnitude of the peak value of the negative or positive half-wave, whichever is higher. In order to prevent the maternal signals from interfering with the polarity detection, the storage capacitors C3 and C4 are short-circuited during the maternal square signal by means of electric switches 7D and 7E. Electric switches 7D and 7E are connected between the monostable sweep stage 5D and the capacitor C3 and the capacitor C4. The switch 7D is provided with a field effect transistor T3, a resistance R14 and a diode D9. The switch 7E is provided with a fieldeffect transistor T4, a resistance R15 and a diode D10. The output of comparator 7C is intermittently scanned by means of an electronic switch 7F comprising a transistor T5 and resistances R16 to R18 as well as a diode D11. When the transistor switch establishes the through-connection, the output voltage of the comparator 7C is supplied into a low-pass filter 7G comprising a resistance R19 and a capacitor C5. The transistor switch is actuated to establish the through-connection by means of square pulses emitted by the second trigger circuit 8. The generation of these pulses will be described below. The square pulses derived by the foetal signals are short as compared to the time constant of the low-pass filter so that the full voltage existing at the output of comparator 7C is applied to the capacitor C5 of the low-pass filter only after a number of scanning cycles. This voltage value, which may be either positive or negative, depending on the polarity of the dominating component of the foetal signal, is supplied into another comparator 7H having a hysteresis. Comparator 7H comprises an amplifier V7, a resistance R20 in the non-inverting input and a positive feedback resistance R21, the ratio of the resistances R21 and R20 determining the hysteresis width of the comparator. The second comparator 7H changes its output voltage only when the number of pulses of the same polarity received is great enough to charge the storage capacitor C5 beyond the value of the hysteresis voltage. The output signal of comparator 7H produces the polarity reversal, as is clear from referring to the left portion of FIG. 4.

The output signal of the comparator 7H controls an electronic switch 7I comprising a field-effect transistor T6, a diode D12 and a resistance R22. Switch 7I actuates polarity-reversal means 7K by determining the sign of amplification of an amplifier V8 whose inverting input comprises a resistance R23 with a value identical to the value of a feedback resistance R24. The non-inverting input of the amplifier is grounded via a resistance R25 and connected by switch 7I to the amplifier input, i.e. to the output of second bandpass 6. In the open condition of the transistor switch 7I, the total amplification of amplifier V8 is −1. In the closed condition of the switch, the total amplification is +1. At the output of amplifier V8, the dominating component is always positive, irrespective of whether in the original foetal signal it was positive or negative. By this means the necessity of any manual operation for the reversal of the signal polarity is eliminated.

Referring to FIG. 4, a circuit arrangement for giving all foetal signals a predetermined polarity and deriving trigger signals therefrom is shown.

The output of the polarity-inverting amplifier V8 is connected to a main storage 8A having a diode D13, a capacitor C6 serving as a storage means and a discharge resistance R26. Main storage 8A is automatically charged to the maximum value of the output voltage unless the monostable sweep stage 5D emits an interlocking signal via an interlocking circuit comprising resistances R27 and R28 and a diode D14 in the inverting input of the polarity-inversing amplifier V8.

An impedance transformer 8B couples main storage 8A to an electronic switch 8D. Impedance transformer 8B comprises a voltage follow-up amplifier V9 which is connected to the switching diode D13 of main storage 8A and feeds back its output to the polarity-inversing amplifier V8 of polarity-inversing means 7K via a resistance R24. Electronic switch 8D comprises a field-effect transistor T7 connected between the output of amplifier V9 and an auxiliary storage 8C, a resistance R30 for setting the operating point of the transistor T7 and interlocking diodes D15 and D16. Auxiliary storage 8C comprises capacitor C7 and a discharge resistance R29. An impedance transformer 8E is connected to the output of the auxiliary storage 8C and comprises a feedback amplifier V10 for decoupling the output signal of the auxiliary storage 8C from a subsequently connected electronic switch 8F. Electronic switch 8F comprises field-effect transistor T8 and a resistance R31 for setting the operating point of transistor T8. Transistor T8 is connected serially with the main storage 8A.

The output of the polarity-inversing means 7K is connected via a resistance R32 to an electronic switch 8G comprising transistors T9 and T10, resistances R33, R34 and R35 and a diode D17. This electronic switch controls the electronic switch 8D at the input of the auxiliary storage 8C via a delay circuit 8H formed by an amplifier V11, a resistance R36 and a capacitor C8.

Connected capacitively to the output of the delay circuit 8H is a reversing stage 8I comprising a transistor T11 with bias resistances R37 and R38, a ballast resistance R39 and a diode D18. Connected to the reversing stage 8I via a coupling resistance R40 is an AND gate circuit 8J comprising a transistor T12 and resistances R41, R42 and R43. AND gate circuit 8J emits an output signal only when a signal is supplied by the reversing stage 8I and when no interlocking signal is supplied by the first channel.

Connected capacitively to the AND gate circuit 8J is an electronic switch 8K comprising a transistor T13, a resistance R44 and a protective diode D19. Switch 8K actuates a monostable sweep stage 8L comprising an amplifier V12, a resistance R45 and a capacitor C9.

Referring to FIG. 4, initially assume that there is a foetal signal, while no maternal signals are encountered at the output of second bandpass filter 6. In this case, the diode D13, in main storage 8A, becomes conductive and the storage capacitor C6, in main storage 8A, is automatically charged to the maximum value of the signal. When this maximum value is reached, the diode D13 is blocked due to the fact that the input voltage drops below the voltage applied to the capacitor C6. As long as the diode D13 is conductive, the electronic switch 8G between the output of the polarity-reversal circuit 7K and the delay circuit 8H are conductive, but as soon as the diode becomes blocked a delay pulse is released by delay circuit 8H which further blocks the diode D13 and, thus, the switch 8D. The blocking of diode D13 and switch 8D is thereby prolongated by the holding time of the delay circuit 8H. During the time of the delay pulse, the electronic switch 8D is in the open position so that the auxiliary storage 8C is disconnected from the main storage 8A. Accordingly, the auxiliary storage 8C discharges itself, starting from the voltage value which was applied to the storage capacitor C6 in main storage 8A at the moment when the electronic switch 8D was closed, the time constant of this discharging process being the same as for the main storage 8A. At the end of the delay time, the electronic switch 8D is again closed and the auxiliary storage 8C is reconnected to the main storage 8A. As long as no signals other than the foetal signals are encountered, these switching operations of the auxiliary storage have practically no importance.

Assume that a maternal signal is now present at the output of second bandpass filter 6 in FIG. 4. The main storage 8A is charged according to the momentary value of the maternal signal until an interlocking signal is received via diode D14 by the polarity-reversal amplifier V8 in polarity-reversal circuit 7K. This interlocking signal comprises the square pulse supplied by the output of amplifier V3 in the monostable sweep stage 5D shown in FIG. 2 and indicates the presence of a maternal signal. An interlocking signal is emitted by the trigger circuit 5D in the first channel each time a maternal signal is present, and the electronic switch 8F is in the closed position when a maternal signal is present. The electronic switch 8D is always in the open position in the presence of either a maternal signal or a pulse originating from the delay circuit. In the presence of an interlocking signal, the diode D13 is blocked so that the capacitor C6 is disconnected. During the discharging process of the main storage 8A, the auxiliary store 8C is connected with main storage 8A and assumes the final voltage value that was applied to the main storage 8A at the moment when the charging process was initiated. After the auxiliary storage 8C is disconnected, the main storage 8A assumes the voltage value which the input signal has at the moment when the interlocking signal is emitted by the trigger circuit 5D. At this moment, the main storage 8A is disconnected from the input signal and connected via the electronic switch 8D to the auxiliary storage 8C, so that it assumes the latter's voltage value. In this manner the main storage 8A is adjusted to the voltage value which it would have had if no maternal signal had been encountered. It should be noted that if the main storage 8A and the auxiliary storage 8C have the same discharging time constant it follows that the main and the auxiliary storage are now automatically and uniformly discharged as long as the interlocking signal is being applied. When the output of the delay circuit 8H ceases, the reversing stage 8I is actuated and emits, in turn, an inverted pulse. This pulse, which indicates the presence of a foetal signal, is now blocked by means of the AND gate circuit 8J due to the fact that the other input of the gate circuit 8J receives simultaneously a maternal interlocking signal after the maternal interlocking signal has passed another reversing stage 8M. By this means, the indication of a foetal signal is prevented in the presence of a maternal signal.

At the end of the maternal interlocking signal, the main storage 8A is reconnected to the output of the polarity-reversal amplifier V8 in polarity-reversal circuit 7K so that the capacitor C6 in main storage 8A may again follow the momentary value of the input signal. At the same time, a through-connection is established by the electronic switch 8D and the switch 8F is opened thereby reconnecting the input of the auxiliary storage 8C to the output of the main storage 8A.

Figure 5:
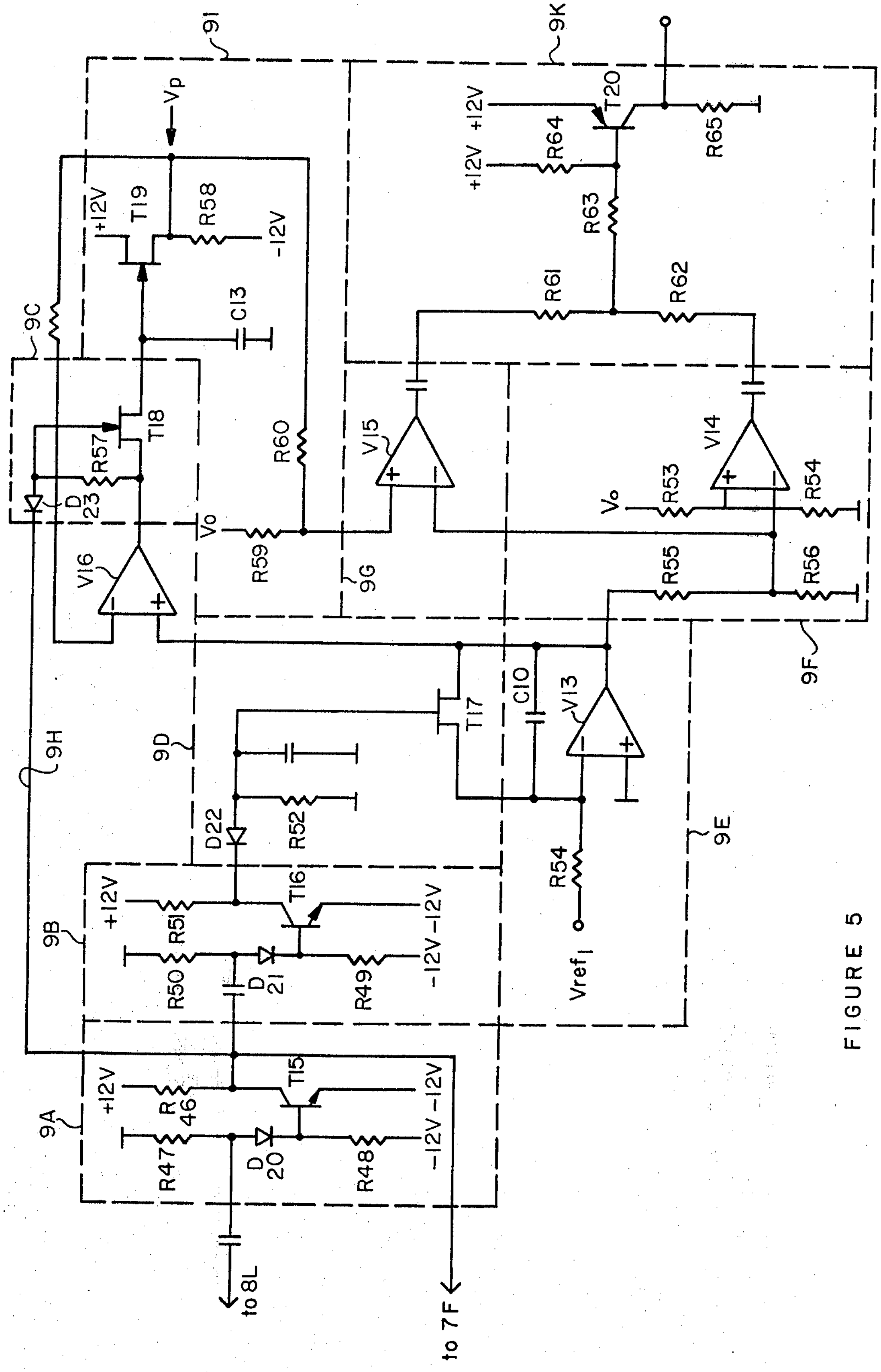
FIG. 5 is a circuit diagram of a preferred embodiment of an error detector.

Referring to FIG. 5, a circuit is shown in which a pulse is substituted in the sequence of the pulses derived from the foetal heart rhythm when the circuit detects the failure of a pulse that was to be expected which may be due to the fact that the foetal signal was masked by a simultaneous maternal signal.

A delayed pulse sequence is derived from the foetal pulse sequence appearing at the output of the amplifier V12 of the monostable sweep stage 8L shown in FIG. 4. Referring to FIG. 5, a pulse former 9A is connected capacitively to the output of the monostable sweep stage 8L. Pulse former 9A comprises a transistor T15, resistances R46, R47, and R48 and a diode D20. Simultaneously with the leading edge of each square pulse emitted by the monostable sweep stage 8L, the pulse former 9A emits a shorter square pulse to a second pulse former 9B and an electronic switch 9C. The electronic switch 9C is formed by a field-effect transistor T18, a resistance R57 and a diode D23. The second pulse former 9B is of a design similar to that of the first pulse former and comprises a transistor T16 and resistances R49, R50 and R51 and a diode D21. Simultaneously with each dropping edge of the short square pulses originating from the pulse former 9A, the pulse former 9B emits a short square pulse which is supplied into a reset switch 9D, which comprises a field-effect transistor T17, a resistance R52 and a diode D22. The switch is connected to an integrator 9E in a manner to ensure that the output voltage of the integrator 9E is reset to 0 when the switch is in its closed position, while the integrator emits a linear ramp voltage when the switch 9D is in the open condition. The integrator 9E comprises an amplifier V13, a capacitor C10 and a resistance R54 connected to a reference voltage Vrefl which determines the rising speed of the integrator 9E and therefore the delay. The output of the integrator is tied together with two comparators 9F and 9G and the electronic switch 9C, via an amplifier V16 arranged as an impedance transformer. The comparator 9F comprises an amplifier V14, resistances R53, R54, R55 and R56, and the comparator 9G comprises an amplifier V15.

Connected to the output of the electronic switch 9C is an impedance transformer 9I provided with a field-effect transistor T19, a storage capacitor C13 and a resistance R58. The output voltage of the impedance transformer 9I and a reference voltage $V_o$ are supplied into a summing circuit consisting of resistances R59 and R60, and the output signal of the summing circuit is, in turn, supplied into the non-inverting input of the amplifier V15 of comparator 9G. The other input of V15 is connected to the inverting input of V14 of comparator 9F. The output of the comparator 9F is, just as the output of the other comparator 9G, supplied into an OR gate circuit 9K comprising a transistor T20 and resistances R61, R62, R63, R64 and R65.

The circuit of FIG. 5 functions as follows:

The pulse former 9A emits short square pulses. These pulses close the electronic switch 9C during the presence of each pulse so that the storage capacitor C13 follows during this time the momentary voltage value existing at the integrator 9E. The trailing edge of these pulses triggers the second pulse former 9B. When the storage capacitor C13 has assumed the voltage value $V_p$ of the integrator, the square pulse emitted by the pulse former 9B resets the integrator 9E to 0. At the end of this square pulse, the integrator emits a linear ramp signal. When the output voltage of the integrattor 9E exceeds a threshold voltage, $Vo \cdot R54/R53$, the output signal of comparator 9F jumps to an inverse polarity and releases an output signal via the OR gate circuit 9K in a manner which will be described below. In the event that no pulse fails in the foetal pulse sequence, this process is continuously repeated, and the integrator 9E applies a voltage to the storage capacitor C13 via the closed switch 9C until it is reset by another square pulse originating from the pulse former 9B.

If it is assumed that a foetal pulse has failed, for example, because it has been masked by a simultaneous maternal signal, the rising ramp voltage of the integrator 9E triggers a first pulse when the threshold voltage of the comparator 9F has been exceeded. As soon as the rising ramp voltage of the integrator 9E reaches a voltage level equalling the sum of the voltage $V_p$ in the impedance transformer 9I and the threshold voltage of the comparator 9F, the output voltage of the amplifier V15 of comparator 9G will jump to the reverse polarity. In order to ensure switching of the comparator 9F when the output voltage of the integrator 9E has reached the threshold voltage and switching of the comparator 9G when the output voltage of the integrator 9E equals the sum of the voltage $V_p$ stored in the impedance transformer 9I and the threshold voltage, the value of resistances are selected to be $R_{53} = R_{56} = R_{59} = R_{54} = R_{55} = R_{60}$. The OR gate circuit 9K is connected with its first input to the output of the comparator 9F and with its other input to the output of the comparator 9G. The comparator 9F emits a pulse when no foetal signal is missing, while the comparator 9G emits only substituted pulses. As a result, a pulse sequence is derived in which the intervals between the pulses correspond to the peak intervals of the foetal signals; and in those cases in which a foetal signal is missing, a correction signal is inserted in the manner described above, at an interval equal to the interval between the two preceding pulses.

It is understood that the above circuit embodiments may be modified in numerous ways without parting from the scope of the present invention. For example, one could use another band-rejection filter 2 to which the power line voltage could be supplied directly from the power lines instead of using a filter of the described type which detects automatically the interference frequency in the signal mixture.

The signals derived by the error detector 9 which indicate the failure of foetal signals may be used in different manners for emitting a corrected sequence of output signals. In this connection, a distinguishing line must be drawn between means for inserting correction pulses into the signal sequence and means which cause the correction of the indicated signal or signals corresponding to the foetal heart rate by mere computational methods, i.e. without the generation of correction pulses.

For example, a circuit arrangement may be provided in which the error detector is connected to substitution means which release a correction signal within the expectancy interval at a moment which corresponds to the time interval between at least the two preceding foetal signals. The expectancy time interval of the failing foetal signal need not be determined only on the basis of the interval between the two preceding foetal signals; rather, it can be determined by tendency calculations from a sequence of several signals, a method which will on the one hand lead to improved accuracy, but on the other hand simultaneously complicate the circuitry.

Further, one may also provide that the indication of the pulses derived from the foetal QRS signals is delayed by more than twice the value of the interval to be expected between two succeeding foetal pulses and that when a foetal signal is received after more than one expectancy period, suitable substitution means will respond and actuate means for substituting at least one correction pulse, whose interval to the preceding pulse is derived from the total interval between the two preceding foetal pulses and the number of intervals to be still expected.

It is also possible to provide an arrangement in which suitable substitution means respond when no foetal signal but an interlocking pulse derived from the maternal ECG signal is received during the expectancy period and the substitution means actuates a circuit which emits a correction signal during the duration of the interlocking pulse.

One may also provide for the substitution of every other failing pulse, when the interval between the foetal signals is exactly half the interval of the maternal signals so that it is very probable that every other foetal pulse is masked by a maternal pulse. As a general rule, however, the failure of foetal signals need not necessarily be caused by maternal signals. Rather, it may also be the result of other interfering effects.

Whereas a number of possible circuits for the substitution of failing pulses has been described, one could similarly enumerate many examples of circuit arrangements for using the signal emitted by the error detector for obtaining a correct indication of the foetal heart rate or intervals without the insertion of substitution pulses. For example, the signals emitted by the error detector which correspond to the number of foetal signals failing at the output of the second trigger means could be used to control a calculating circuit which would divide the time interval between the last two recorded pulses by two whenever a foetal signal fails. Analogously, several corresponding corrections would have to be applied if several pulses were missing.

Moreover, the maternal and the foetal signals could be correlated in several different manners. One could, for example, imagine a case where the foetus is already dead and where the maternal signals are erroneously detected as the foetal signals. To prevent this error, one could compare the cycle time and the phasing of the signals in the first and in the second channel. The uniformity of the frequency and phasing would lead to the conclusion that the signals appearing in the second channel are erroneously derived from maternal signals so that their indication must be suppressed.

I claim:

1. Circuitry for deriving a sequence of pulses corresponding to the heart rate of a foetus from a composite ECG signal which may include signals produced by the mother and other sources including electrical power line noise in addition to the desired foetal signals comprising:

means coupled to receive a composite ECG signal having repetitive foetal QRS complex signal component and a maternal QRS complex signal component, each having varying amplitudes and repetition periods for producing a composite output having dynamic amplitude variations within a predetermined dynamic range in response to the maternal QRS complex signal component of the composite ECG signal;

tracking band-rejection filter means connected to receive the composite output for suppressing electrical power line noise in the composite output and producing a noise filtered output in response to the composite output;

a first signal processing channel having a first band-pass filter connected to receive the noise filtered output of the tracking band-rejection filter means and having a pass range adapted to pass without appreciable attenuation frequencies of the maternal QRS complex signals which are lower in frequency than the frequencies contained in the foetal QRS complex signals and attenuate the amplitude of the foetal QRS complex signals and produce an output having foetal QRS complex signals of smaller amplitude than maternal QRS complex signals, first polarity-reversal means connected to receive the output of the first band-pass filter for ensuring that dominating components of the maternal QRS complex signals have a predetermined polarity and for producing an output having maternal QRS complex signals of said predetermined polarity, and a first trigger circuit connected to receive the output of the first polarity-reversal means for producing as an output a sequence of pulses in response to the appearance of the maternal signals;

a second signal processing channel having a second band-pass filter connected to receive the noise filtered output of the tracking band-rejection filter means and having a pass range adapted to pass without appreciable attenuation frequencies of the foetal QRS complex signals and attenuate frequencies of the maternal QRS complex signals for producing an output having maternal QRS complex signals attenuated in relation to the foetal QRS complex signals, a second polarity-reversal means connected to receive the output of the second band-pass filter for producing an output having the dominating component of each foetal QRS complex signal of a predetermined polarity, and a second trigger circuit connected to receive the output from the second polarity reversal means for producing as an output a sequence of foetal pulses in response to the foetal QRS complex signals;

interlock means coupled to the first trigger circuit and the second trigger circuit for producing interlocking pulses in response to the sequence of pulses produced by the first trigger circuit and for applying said interlocking pulses to the second trigger circuit during the occurrence of maternal QRS complex signals and for preventing the second trigger circuit from triggering during the occurrence of maternal QRS complex signals; and error detector means connected to receive the output of the second trigger circuit for calculating an expectancy interval derived from at least one preceding foetal QRS complex signal period and for producing an error signal when no output is received from the second trigger circuit during the expectancy interval.

2. Circuitry as in claim 1 including:

means for producing a time-delayed indication of the foetal pulses produced in response to the foetal QRS complex signals, the time delay being at least the maximum physiological repetition period occurring between preceding successive foetal QRS complex signals; and substituting means coupled to the error detector means for releasing a correction signal within the expectancy interval at a moment corresponding to the time interval between at least two preceding foetal pulses.

3. Circuitry as in claim 1 wherein the second trigger circuit comprises:

a peak rectifier having a main storage with a discharging time constant connected to receive the output from the second polarity reversal means and interlocking pulses from the interlock means for charging the main storage in response to the output from the second polarity-reversal means during an absence of an interlocking pulse output from the interlock means;

an auxiliary storage having the same discharging time constant as the main storage;

a first electronic switch coupled to the interlock means to receive the interlocking pulses and to the second polarity-reversal means to receive the output from the second polarity-reversal means and connected to the main storage and the auxiliary storage for coupling the auxiliary storage to the main storage in response to receiving no output from the second polarity-reversal means and receiving no interlocking pulse and for uncoupling the auxiliary storage from the main storage in response to receiving either the output from the second polarity reversal means or an interlocking pulse; and a second electronic switch connected to the interlock means to receive the interlocking pulses and to the main storage and the auxiliary storage for coupling the auxiliary storage to the main storage in response to receiving an interlocking pulse and for uncoupling the auxiliary storage from the main storage in response to not receiving an interlocking pulse.

* * * * *